(12) United States Patent
Berdichevsky

(10) Patent No.: US 8,066,287 B2
(45) Date of Patent: Nov. 29, 2011

(54) DYNAMIC SEAL

(75) Inventor: Alexander Berdichevsky, Farmington Hills, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 12/827,747

(22) Filed: Jun. 30, 2010

(65) Prior Publication Data

US 2010/0264604 A1  Oct. 21, 2010

Related U.S. Application Data

(60) Division of application No. 12/048,745, filed on Mar. 14, 2008, now Pat. No. 7,770,897, which is a division of application No. 11/285,652, filed on Nov. 22, 2005, now Pat. No. 7,854,433, which is a continuation-in-part of application No. 11/065,023, filed on Feb. 24, 2005, now Pat. No. 7,854,432.

(51) Int. Cl.
*F16J 15/32* (2006.01)
(52) U.S. Cl. .................................. 277/551; 277/571
(58) Field of Classification Search .................. 277/551, 277/571
See application file for complete search history.

(56) References Cited

U.S. PATENT DOCUMENTS

| | | | |
|---|---|---|---|
| 2,482,029 A | 9/1949 | Reynolds | |
| 2,635,907 A | 4/1953 | Heimbuch | |
| 2,697,623 A | 12/1954 | Mosher | |
| 2,731,284 A | 1/1956 | Chambers, Jr. et al. | |
| 2,736,583 A | 2/1956 | Marvin | |
| 2,736,585 A | 2/1956 | Riesing | |
| 2,736,586 A | 2/1956 | Riesing | |
| 2,743,950 A | 5/1956 | Helfrecht et al. | |
| 2,758,853 A | 8/1956 | Beck | |
| 2,797,944 A | 7/1957 | Riesing | |
| 3,005,648 A | 10/1961 | Christensen | |
| 3,049,356 A | 8/1962 | Talamonti | |

(Continued)

FOREIGN PATENT DOCUMENTS

DE  20111007 U1  2/2002

(Continued)

OTHER PUBLICATIONS

Radial Lip NOK Oil Seals Inch and Metric, Cat. No. 014E-10-85 (2 pages).

(Continued)

*Primary Examiner* — Vishal Patel

(74) *Attorney, Agent, or Firm* — Ronald W. Wangerow, Esq.; Harness, Dickey & Pierce, P.L.C.

(57) ABSTRACT

A dynamic shaft seal assembly is provided including a dynamic seal for engaging a rotary shaft. The dynamic seal includes a base portion that is mounted within a casing and has an axially extending barrel portion extending from a radially inner end of the base portion. The axially extending barrel portion terminates in a radially extending leg portion which extends inwardly from an end of the axially extending portion. A generally conically shaped seal portion extends from an end of the radially extending portion and the seal portion includes a radially inner face engaging the shaft and a radially outer face having a stiffening bead integrally formed thereon. The stiffening bead reduces the seal's propensity for "bell mouthing" while the axially extending barrel portion provides improved shaft followability for the dynamic seal.

13 Claims, 6 Drawing Sheets

U.S. PATENT DOCUMENTS

| | | |
|---|---|---|
| 3,356,376 A | 12/1967 | Bradfute et al. |
| 3,477,730 A | 11/1969 | Kare et al. |
| 3,554,566 A | 1/1971 | Bechtrold et al. |
| 3,572,734 A | 3/1971 | Holt |
| 3,612,546 A | 10/1971 | Otto et al. |
| 3,623,738 A | 11/1971 | MacDonnell |
| 3,785,660 A | 1/1974 | Bush |
| 3,822,890 A | 7/1974 | Bourgeois |
| 3,827,703 A | 8/1974 | Brink |
| 3,921,987 A | 11/1975 | Johnston |
| 3,921,990 A | 11/1975 | Johnston |
| 3,941,396 A | 3/1976 | Bailey et al. |
| 4,021,049 A | 5/1977 | Phelps et al. |
| 4,037,849 A | 7/1977 | Thumm |
| 4,102,538 A | 7/1978 | Bertin |
| 4,106,781 A | 8/1978 | Benjamin et al. |
| 4,126,320 A | 11/1978 | Pendleton |
| 4,190,258 A | 2/1980 | Arai et al. |
| 4,208,060 A | 6/1980 | St. Laurent, Jr. |
| 4,226,428 A | 10/1980 | Paptzun |
| 4,229,010 A | 10/1980 | St. Laurent, Jr. |
| 4,270,762 A | 6/1981 | Johnston |
| 4,274,641 A | 6/1981 | Cather, Jr. |
| 4,300,778 A | 11/1981 | Gagne |
| 4,344,631 A | 8/1982 | Winn |
| 4,348,031 A | 9/1982 | Johnston |
| 4,360,208 A * | 11/1982 | Hill et al. .................. 277/504 |
| 4,413,829 A | 11/1983 | Pietsch |
| 4,449,717 A | 5/1984 | Kitawaki et al. |
| 4,474,484 A | 10/1984 | MacInnes et al. |
| 4,519,616 A | 5/1985 | Johnston |
| 4,531,747 A | 7/1985 | Miura et al. |
| 4,550,920 A | 11/1985 | Matsushima |
| 4,553,763 A | 11/1985 | Ehrmann |
| 4,585,236 A | 4/1986 | Simmons et al. |
| 4,588,195 A | 5/1986 | Antonini et al. |
| 4,611,931 A | 9/1986 | Brandenstein et al. |
| 4,630,834 A | 12/1986 | Muller et al. |
| 4,635,947 A | 1/1987 | Hatayama |
| 4,650,196 A * | 3/1987 | Bucher et al. ............... 277/553 |
| 4,750,748 A | 6/1988 | Visser |
| 4,805,919 A | 2/1989 | Wiblyi et al. |
| 4,815,749 A | 3/1989 | Johnston |
| 4,844,484 A | 7/1989 | Antonini et al. |
| 4,940,248 A | 7/1990 | Kilthau et al. |
| 4,986,553 A | 1/1991 | Preston et al. |
| 4,995,621 A | 2/1991 | Devouassoux et al. |
| 5,004,248 A * | 4/1991 | Messenger et al. ............ 277/351 |
| 5,137,285 A | 8/1992 | Pick |
| 5,167,419 A | 12/1992 | Robertson |
| 5,183,269 A * | 2/1993 | Black et al. ................... 277/349 |
| 5,190,299 A | 3/1993 | Johnston |
| 5,201,528 A * | 4/1993 | Upper .......................... 277/394 |
| 5,244,215 A | 9/1993 | Cather, Jr. et al. |
| 5,292,199 A * | 3/1994 | Hosbach et al. ............ 384/478 |
| 5,348,312 A | 9/1994 | Johnston |
| 5,348,313 A | 9/1994 | Pawlakowitsch et al. |
| 5,370,404 A | 12/1994 | Klein et al. |
| 5,398,942 A * | 3/1995 | Duckwall et al. ............. 277/353 |
| 5,427,387 A | 6/1995 | Johnston |
| 5,462,287 A | 10/1995 | Hering et al. |
| 5,462,288 A | 10/1995 | Hering et al. |
| 5,476,270 A | 12/1995 | vom Schwemm et al. |
| 5,501,469 A | 3/1996 | Ducugnon et al. |
| 5,509,667 A | 4/1996 | Klein et al. |
| 5,556,112 A | 9/1996 | Brandt |
| 5,624,290 A | 4/1997 | Von Bergen et al. |
| 5,668,426 A | 9/1997 | Lamert et al. |
| 5,711,534 A | 1/1998 | Bengoa et al. |
| 5,791,658 A | 8/1998 | Johnston |
| 5,842,828 A | 12/1998 | Ozawa et al. |
| 5,909,880 A | 6/1999 | Waskiewicz |
| 5,921,555 A | 7/1999 | Johnston |
| 5,957,461 A | 9/1999 | Ulrich |
| 5,967,527 A | 10/1999 | Fabro et al. |
| 6,019,229 A | 2/2000 | Rao |
| 6,298,955 B1 | 10/2001 | Frost |
| 6,409,177 B1 | 6/2002 | Johnston |
| 6,428,013 B1 | 8/2002 | Johnston et al. |
| 6,481,896 B1 | 11/2002 | Ohtsuki et al. |
| 6,513,812 B1 | 2/2003 | Yang et al. |
| 6,520,507 B2 | 2/2003 | Pataille et al. |
| 6,601,855 B1 | 8/2003 | Clark |
| 6,688,603 B2 | 2/2004 | vom Schemm |
| 6,702,293 B2 | 3/2004 | Endo et al. |
| 6,860,486 B2 | 3/2005 | Hacker et al. |
| 6,921,080 B2 | 7/2005 | Johnen |
| 6,921,082 B2 | 7/2005 | Lutaud |
| 6,945,537 B2 | 9/2005 | Guillerme et al. |
| 7,004,471 B2 | 2/2006 | Bryde et al. |
| 7,134,669 B2 | 11/2006 | Uhrner |
| 7,172,201 B2 | 2/2007 | Uhrner |
| 7,854,433 B2 | 12/2010 | Berdichevsky |
| 2002/0117810 A1 | 8/2002 | Schemm |
| 2003/0006563 A1 | 1/2003 | Cater et al. |
| 2003/0085527 A1 | 5/2003 | Hacker et al. |
| 2003/0189293 A1 | 10/2003 | Johnen |
| 2003/0230850 A1 | 12/2003 | Bruyere et al. |
| 2003/0230852 A1 | 12/2003 | Bengoa et al. |
| 2004/0160014 A1 | 8/2004 | Uhrner |
| 2005/0098959 A1 | 5/2005 | Uhrner |
| 2005/0167928 A1 | 8/2005 | Park et al. |
| 2006/0022414 A1 | 2/2006 | Balsells |
| 2006/0125192 A1 | 6/2006 | Johnston |
| 2006/0290070 A1 | 12/2006 | Park |

FOREIGN PATENT DOCUMENTS

| | | |
|---|---|---|
| DE | 20121487 U1 | 12/2002 |
| DE | 10353305 | 5/2004 |
| DE | 10353304 A1 | 6/2005 |
| JP | 2000320689 A | 11/2000 |

OTHER PUBLICATIONS

Seal Handbook, Chicago Rawhide, Cat. No. 457010 (Jun. 1999) (2 pages).

* cited by examiner

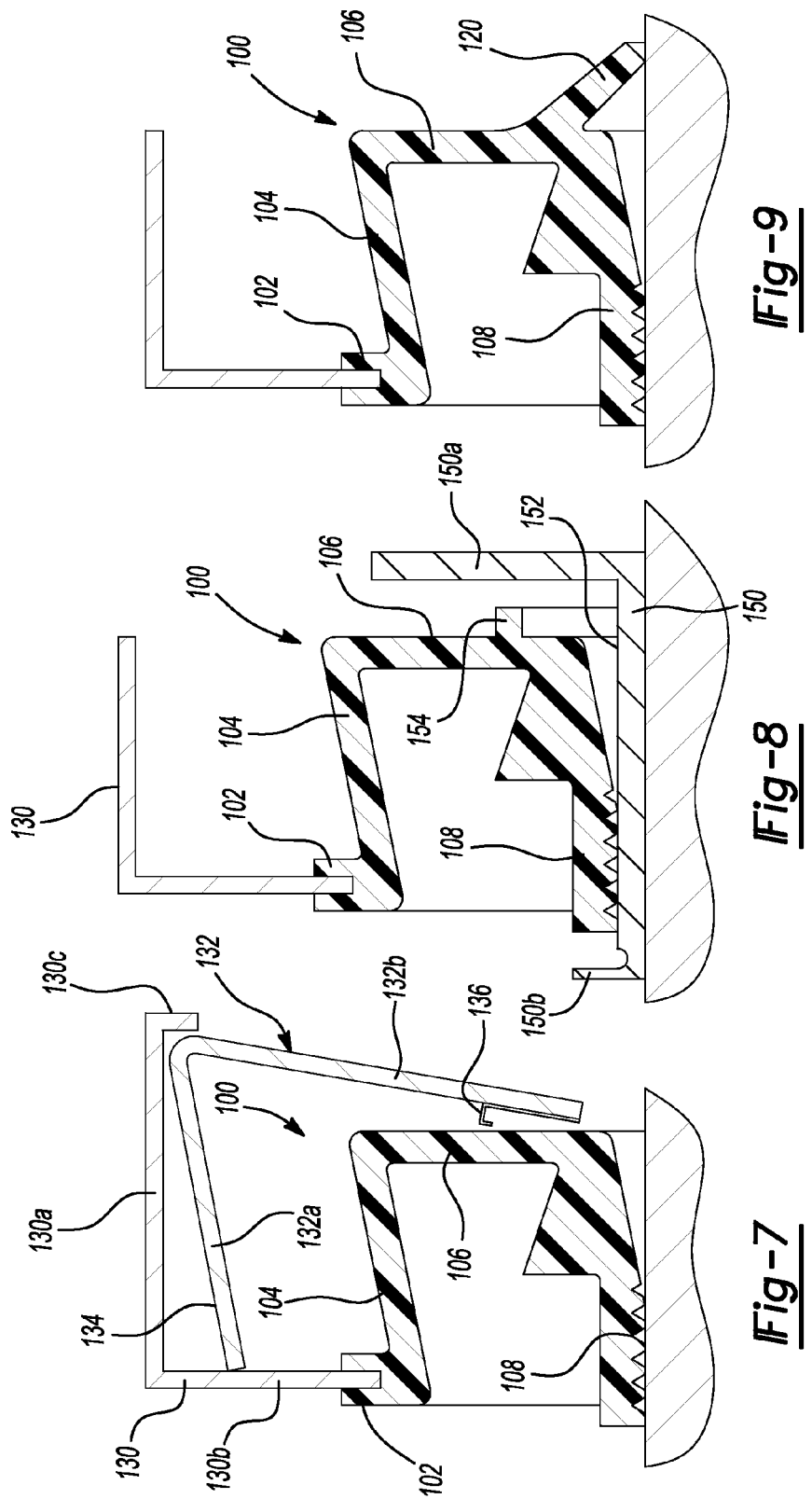

DYNAMIC SEAL

CROSS-REFERENCE TO RELATED APPLICATIONS

This application is a divisional of U.S. patent application Ser. No. 12/048,745, filed Mar. 14, 2008 (now U.S. Pat. No. 7,770,897), which is a divisional of Ser. No. 11/285,652, filed Nov. 22, 2005 (now U.S. Pat. No. 7,854,433), which is a continuation-in-part of U.S. patent application Ser. No. 11/065,023, filed on Feb. 24, 2005 (now U.S. Pat. No. 7,854,432), the disclosures of which are incorporated herein by reference in their entirety.

FIELD OF THE INVENTION

The present invention relates to "lay-down" dynamic shaft seals, and more particularly, to a dynamic shaft seal design to reduce the seal's torque, propensity for bell mouthing, and for providing improved shaft followability and improved ability to withstand internal excessive pressure or vacuum. The "lay-down" seal for their function rely on hydrodynamic pumping features as opposed to "standard" or "point-contact" seals that rely primarily on the intrinsic ability of some elastomers to pump in properly designed seals.

BACKGROUND AND SUMMARY OF THE INVENTION

Rotary shaft seals have been utilized in machinery, the automobile industry, as well as other industries. Three major problems associated with seals designed to have substantial contact areas between the shaft and the lip of the seal are "bell mouth," the shaft followability at low temperatures, and oil carbonization in the pumping grooves due to local temperature rise causing increased torque. "Bell mouth" is a phenomenon associated with the lift of the edge of the lip from the shaft. The problem is extenuated for highly incompressible materials, like rubber and PTFE. The ability of the seal to follow the shaft when the shaft either wobbles or is misaligned is also important to a seal design.

The present invention is designed to reduce seal torque, the propensity for "bell mouthing" and also provides for improved shaft followability at low temperatures. The dynamic seal includes an annular mounting portion which is capable of being mounted to a casing which surrounds a rotary shaft. The seal includes an axially extending portion extending from the radially inner end of the mounting portion, with a radially extending portion extending inwardly from an end of the axially extending portion. A generally conically shaped seal portion extends from an end of the radially extending portion with the seal portion including a radially inner face provided with a plurality of grooves or ribs and a radially outer face having a special bead defining a region of increased thickness. The bead acts as an integral spring to control the gap between the essentially conical portion of the seal and the shaft as well as a means for counteracting the "bell mouthing" propensity of the seal portion. The bead can have different shapes including a triangular-cross section or a rounded bead, as well as other configurations which are deemed to be appropriate. The bead is positioned slightly away from the edge of the lip to provide a sufficient lip "lay-down" to properly engage the hydrodynamic pumping features, which would normally be located on the lip contact are between the edge of the seal and the bead. The flexibility of the axially extending portion of the seal provides an improvement in the shaft followability due to the generally cylindrical shape of the axially extending portion having lower bending stiffness. Therefore, if the material of the seal does not have sufficient intrinsic elasticity, making the axially extending portion of the seal in a generally cylindrical shape improves the overall shaft followability. The length and the wall thickness of the cylindrical portion allow one to control the degree of flexibility to match the application requirements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a cross-sectional view of a dynamic seal according to the principles of the present invention, incorporating a deflection limiting retainer;

FIG. 8 is a cross-sectional view of a dynamic seal according to the principles of the present invention including an interior shaft ring;

FIG. 9 is a cross-sectional view of a dynamic seal according to the principles of the present invention including a dust lip integrally formed therewith;

DETAILED DESCRIPTION OF THE PREFERRED EMBODIMENTS

The following description of the preferred embodiment(s) is merely exemplary in nature and is in no way intended to limit the invention, its application, or uses.

Figure 1:
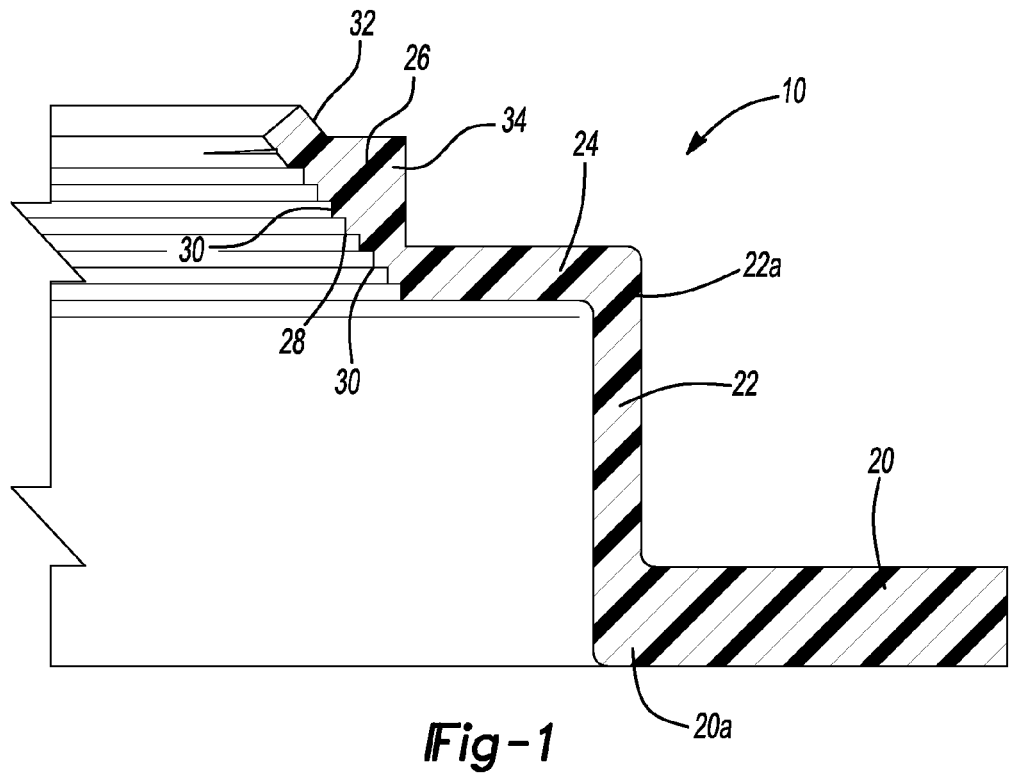
FIG. 1 is a detailed cross-sectional view of the dynamic seal according to the principles of the present invention.
Figure 2:
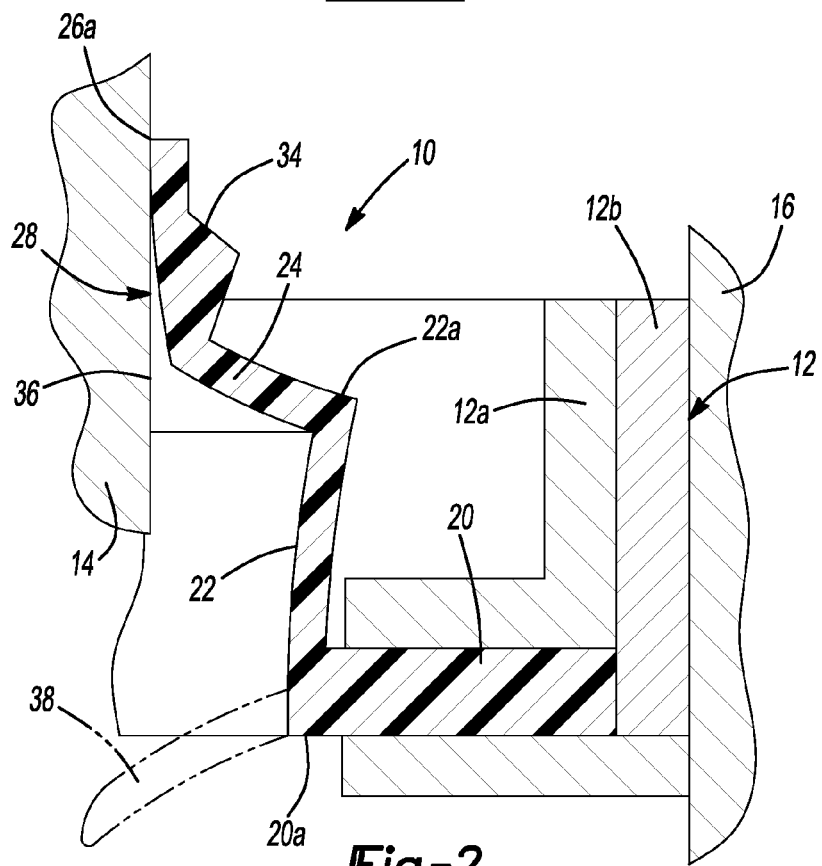
FIG. 2 is a cross-sectional view of the dynamic seal disposed against a shaft according to the principles of the present invention.
Figure 3:
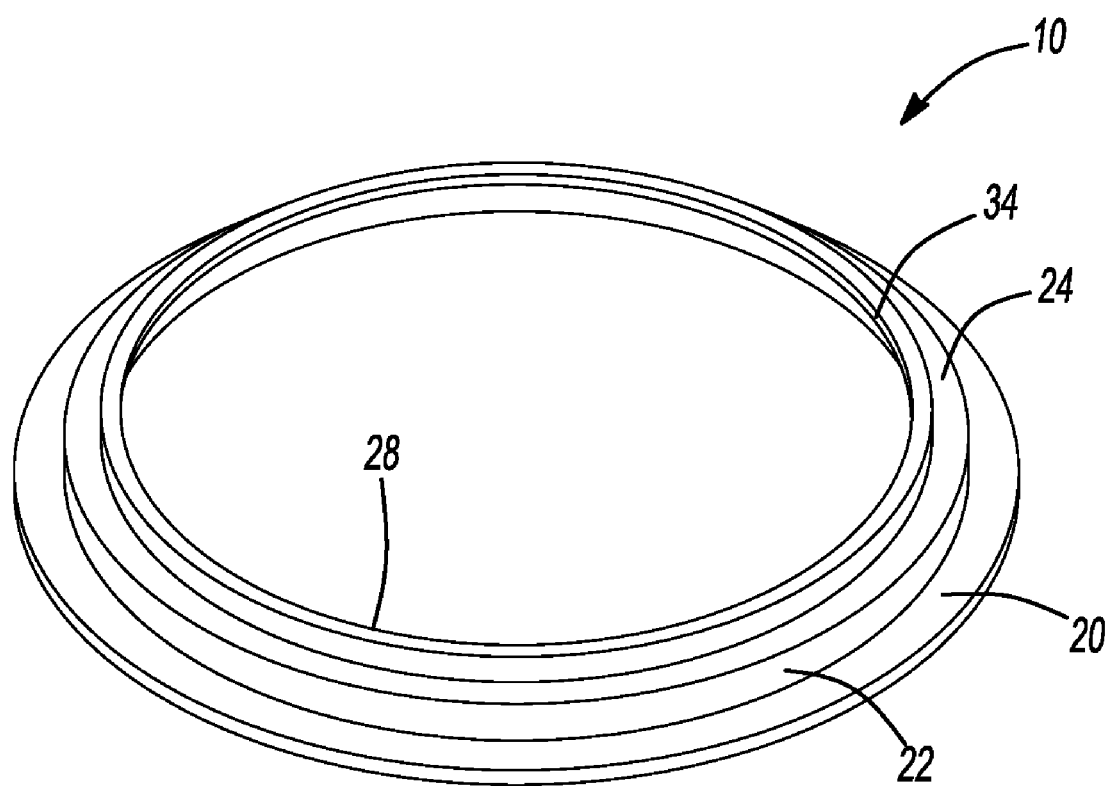
FIG. 3 is a perspective view of the dynamic seal according to the principles of the present invention.

With reference to FIGS. 1-3, the dynamic seal 10, according to the principles of the present invention, will now be described. The dynamic seal 10 is mounted to a casing 12 which is disposed in a fixed housing 16 (best shown in FIG. 2) in a manner which is well known in the art. The dynamic seal 10 engages a rotary shaft 14 so that the dynamic seal 10 provides a sealed relationship between the rotary shaft 14 and the housing 16 in which the casing 12 is disposed. With reference to FIG. 1, the dynamic seal 10 includes a mounting portion 20 which is designed to be engaged between first and second portions 12A, 12B of casing 12. It should be noted that the mounting portion 20 can take on many shapes and forms and is not considered to be particularly relevant to the present invention. The mounting portion 20 is mounted to the casing 12 which can be made of plastic or metal and the mounting portion 20 can be clamped or bonded thereto according to well known mounting techniques.

The dynamic seal 10 includes an axially extending barrel portion 22 extending from a radially inner end 20A of the mounting portion 20. The axially extending barrel portion 22 is preferably generally cylindrical in shape although other shapes, such as conical or a convoluted curve shape, can also be utilized. The dynamic seal 10 includes a radially extending portion 24 extending inwardly from a distal end 22B of the axially extending barrel portion 22. A generally conically shaped seal portion 26 extends from a radially innermost end 24A of the radially extending portion 24. The seal portion 26 includes a radially inner face 28 which may be provided with a plurality of grooves 30. The grooves 30 can be helical in shape or can take other known forms. The grooves 30 provided in the radially inner surface 28 of the seal portion 26 are capable of retaining oil therein in order to provide lubrication between the dynamic shaft seal 10 and rotary shaft 14 and also can provide a pumping function for returning leaked oil to the oil side of the seal. A radially outer face 32 of the conically shaped seal portion 26 is provided with a stiffening bead 34 defining a region of increased thickness. The stiffening bead 34 can have different shapes, including a triangular shape, as shown, or can have rounded or other shape configurations. The stiffening bead 34 is positioned slightly away from the end edge 26A of the lip 26 to allow a proper contact area to develop. The bead 34 serves as an integrally formed spring for biasing the sealing lip 26 against the rotary shaft 14 for counteracting bell mouthing of the sealing lip 26. Normally, the seal lip-free edge faces the oil side. However, reverse mounting is also possible. In that case, the design of the spiral grooves have to be accommodated appropriately to pump in the direction of the oil sump.

The improvement in the shaft followability of the dynamic seal 10 is provided by the axially extending barrel portion 22. The generally cylindrical shape of the barrel portion 22 has a lower bending stiffness than other structures; therefore, the axially extending barrel portion 22 is able to readily account for a wobbling shaft or a shaft that is out of center relative to the housing 16.

It should be noted that if desired or advantageous in a particular application, the dynamic shaft seal 10 of the present invention can optionally include one or more axial or radial dirt protective lips 38 as are known in the art, one of which is shown, for example, in FIG. 2. The optional dirt protective lip 38 can be formed integrally with the dynamic shaft seal, or can be formed separately therefrom and attached thereto, and can have any of a number of shapes or configurations, as is also known in the art. In addition, the lip 38 can protrude transversely from the dynamic shaft seal in any of a number of directions, including, but not limited to, the exemplary angular relationship protruding generally radially away and axially away from the shaft-engaging sealing components, as shown, for example, in FIG. 2.

The radially extending leg portion 24 can be straight, as shown, or alternatively, can be provided with a convoluted shape. The outer diameter of the shaft is specifically designed to have a larger diameter than the inner diameter of the radially inwardly extending leg portion 24. As illustrated in FIG. 2, the generally conically shaped seal portion 26 is designed to take on a generally cylindrical form when deformed by the rotary shaft 14 and the leg 24 is designed to apply pressure to the heel portion 36 of the seal portion 26. The leg portion 24 acts radially on the end 22A of the barrel portion 22 which has a length sufficient to allow the barrel portion 22 to flex radially inwardly and outwardly to accommodate for shaft wobble or shaft misalignment. The length of the leg portion is derivative from the length of the seal portion, the amount of the seal-to-shaft interference, and the distance between the casing and the shaft.

The dynamic shaft seal 10 of the present invention can be utilized for isolating an oil environment from an air environment disposed on either side of the dynamic seal 10. In order to optimize the seal design, the length of the seal portion 26 and the stiffness of the bead 34 (geometry, thickness, material, etc.) are specifically chosen for particular applications. Furthermore, the thickness of the radially extending leg portion 24 is also specifically designed to provide sufficient pressure on the heel 36 of the seal portion 26. The thickness and length of the barrel portion 22 should also be specifically designed to accommodate the requisite flexibility of a particular application. The seal material composition for the dynamic seal can include plastic, rubber, or any of a wide variety of known elastomers, such as PTFE, TPE (thermoplastic elastomers), TPV (thermoplastic vulcanizates), and Flouroprene™ material, a composition described in U.S. Pat. No. 6,806,306. An additional embedded spring in the bead may be utilized in order to extend the life of the seal due to the fact that creep can occur in thermoplastic or elastomeric materials which prevents the material from regaining its original properties. The spring would then provide an additional radial load on the seal surface that the thermoplastic material is incapable of maintaining over a long life. The spring can also improve the robustness of the seal required in contaminated environments. Instead of imbedding, the spring can be placed in a specially designed and manufactured spring groove after completion of the molding operation (as is normal with other radial lip seals).

Figure 4:
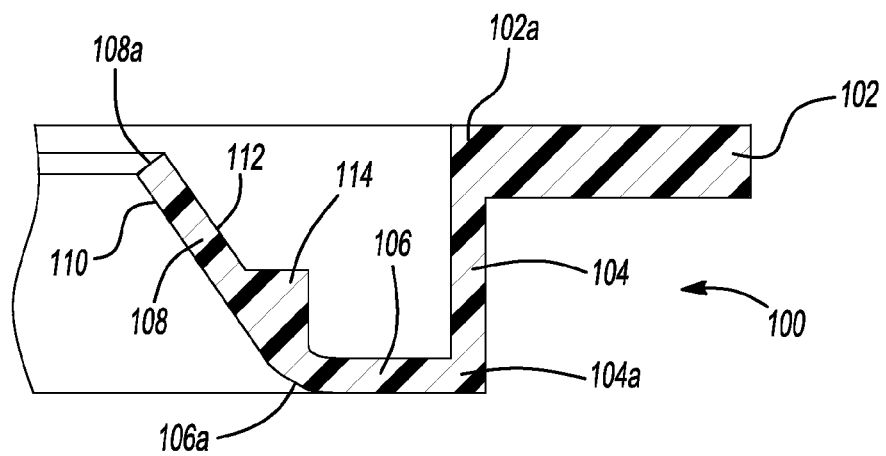
FIG. 4 is a cross-sectional view of second embodiment of the dynamic seal according to the principles of the present invention.
Figure 5:
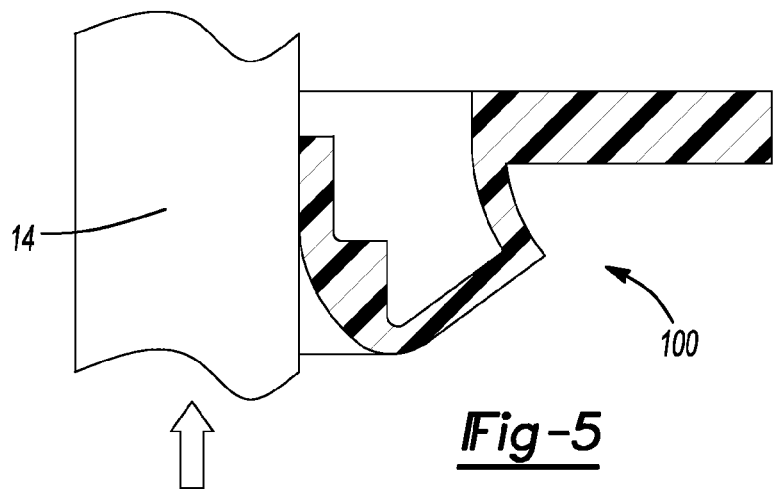
FIG. 5 is a cross-sectional view of the seal of FIG. 4 shown under internal pressure.
Figure 6:
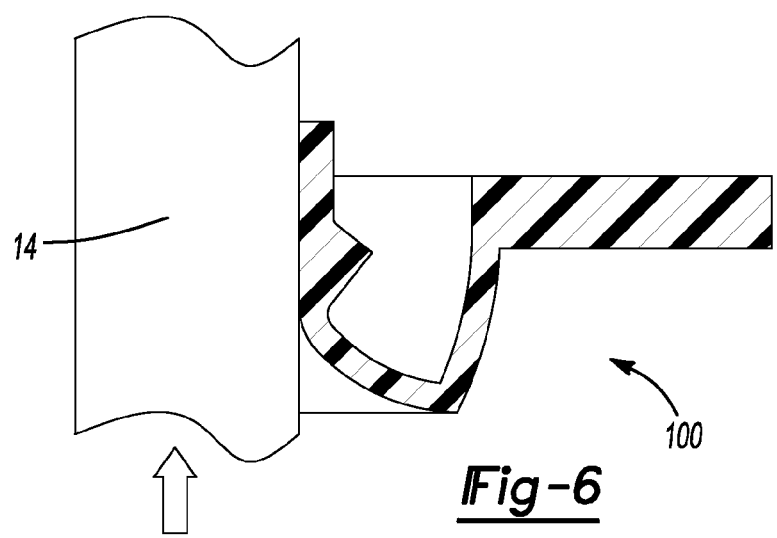
FIG. 6 is a cross-sectional view of the seal of FIG. 4 shown under vacuum.

With reference to FIGS. 4-6, a dynamic seal according to a second embodiment of the present invention will now be described. The dynamic seal 100 includes a mounting portion 102 which is designed to be engaged between first and second portions of a casing. It should be noted that the mounting portion 102 can take on many shapes and forms and is not considered to be particularly relevant to the present invention. The mounting portion 102 is mounted to a casing which can be made of plastic or metal and the mounting portion 102 can be clamped, bonded or otherwise secured thereto according to well-known mounting techniques.

The dynamic seal 100 includes an axially extending barrel portion 104 extending from a radially inner end 102A of the mounting portion 102. The axially extending barrel portion 104 is preferably generally cylinder shaped although other shapes, such as conical or a convoluted curve shape, can also be utilized. The dynamic seal 100 includes a radially extending portion 106 extending inwardly from a distal end 104A of the axially extending barrel portion 104. A generally conically shaped seal portion 108 extends from a radially innermost end 106A of the radially extending portion 106.

The axially extending barrel portion 104 extends in a first axial direction from mounting portion 102, while the generally conically shaped seal portion 108 extends from the radially innermost end 106A of radially extending portion 106 in an axial direction opposite to the first axial direction.

The seal portion 108 includes a radially inner face 110 which may be provided with at least one groove or a plurality of grooves. The grooves can be helical in shape or can take other known forms. The grooves provided in the radially inner surface 110 of the seal portion 108 are capable of retaining oil therein in order to provide lubrication between the dynamic shaft seal 100 and rotary shaft 14 and also can provide a pumping function for returning leaked oil to the oil side of the seal.

A radially outer face 112 of the conically shaped seal portion 108 is provided with a stiffening bead 114 defining a region of increased thickness. The stiffening bead 114 can have different shapes, including a triangular shape as shown, or can have rounded or other shaped configurations. The stiffening bead 114 is positioned slightly away from the end edge 108A of the lip 108 to allow a proper contact area to develop. The bead 114 serves as an integrally formed spring for biasing the sealing lip 108 against the rotary shaft 114 for counteracting bell mounting of the sealing lip 108. The location and shape of the bead 114 is dependent upon the specific application and the desired spring force.

Normally, the seal lip-free edge 108A faces the oil side. However, reverse mounting is also possible. In that case, the design of the spiral grooves has to be accommodated appropriately to pump in the direction of the oil side.

With the design of the present invention, the dynamic seal 100 is capable of withstanding excessive internal pressure or vacuum. FIG. 5 illustrates a cross-sectional view of the dynamic seal 100 disposed against a shaft 14 and under a pressure of 170 MBAR. FIG. 6 illustrates the dynamic seal 100 disposed against a shaft 14 and exposed to a vacuum pressure of −50 MBAR. In the case of excessive internal pressure being applied to the dynamic seal 100, the axially extending barrel portion 22 which radially overlaps the seal portion 108 provides a radial spring acting upon the radially extending portion 106 to limit the deformation in the seal portion 108.

In the case of an excessive vacuum being applied, the axially extending barrel portion 104 limits the axial movement of radially extending portion 106, thus limiting the axial movement of the seal portion 108.

The improvement in the shaft followability of the dynamic seal 100 is provided by the axially extending barrel portion 104. The generally cylindrical shape of the barrel portion 104 has a lower bending stiffness than other structures. Therefore, the axially extending barrel portion 104 is able to readily account for a wobbling shaft or a shaft that is out of center relative to the housing.

It should be noted that if desired or advantageous in a particular application, the dynamic seal shaft 100 of the present invention can optionally include one or more axial or radial dirt protective lips 120 as illustrated in FIG. 9. The optional dirt protective lip 120 can be formed integrally with the dynamic shaft seal, or it can be formed separately therefrom and attached thereto and can have any of a number of shapes or configurations, as is also known in the art. The radially extending leg portion 106 can be straight, as shown, or alternatively, can be provided with an angled or convoluted shape. As illustrated in FIGS. 5 and 6, the generally conically shaped seal portion 108 is designed to take on a generally cylindrical form when deformed by the rotary shaft 14 and the leg 106 is designed to apply pressure to the heel portion of the seal portion 108. The leg portion 106 acts radially on the end 104A of the barrel portion 104 which has a length sufficient to allow the barrel portion 104 to flex radially inwardly and outwardly to accommodate for shaft wobble or shaft misalignment. The length of the leg portion 106 is derivative from the length of the seal portion 108, the amount of the seal-to-shaft interference, and the distance between the casing and the shaft.

The dynamic shaft seal 100 can be utilized for isolating an oil environment from an air environment disposed on either side of the dynamic seal 100. In order to optimize the seal design, the length of the seal portion 108 and the stiffness of the bead 114 (geometry, thickness, material, etc.) are specifically chosen for particular applications. Furthermore, the thickness of the radially extending leg portion 106 is also specifically designed to provide sufficient pressure on the heel of the seal portion 108. The thickness and length of the barrel portion 104 should also be specifically designed to accommodate the requisite flexibility of a particular application. The seal material composition for the dynamic seal can include plastic, rubber, or any of a variety of known elastomers, such as PTFE, TPE (thermoplastic elastomers), TPV (thermoplastic vulcanizates) and Flouroprene™ material.

With reference to FIG. 7, the dynamic seal 100 according to the principles of the present invention is shown mounted to a retainer ring 130. The retainer ring 130 is designed to be press fit within a bore of a housing and includes an axially extending portion 130A, a first radially extending mounting portion 130B to which the dynamic seal 100 is mounted, and a retaining flange 130C disposed at an opposite end of the axially extending portion 130A. A support ring 132 includes an axially extending arm portion 132A and a radially inwardly extending arm portion 132B. The axially extending arm portion 132A is designed to be retained by the retainer arm portion 130 and can include an inwardly angled exterior surface 134 which facilitates the support ring 132 to being press fit within retaining flange 130C. The radially inwardly extending arm portion 132B is disposed adjacent to the radially extending portion 106 of dynamic seal 100 with an axial gap extending therebetween. The gap 136 permits axial movement of the radially extending portion 106, but limits the axial movement thereof relative to the mounting portion 102.

With reference to FIG. 8, a dynamic seal 100, according to the principles of the present invention is shown utilized in a cassette-type seal including a running sleeve 150 adapted to be mounted to a shaft and to be rotated therewith. The running sleeve 150 includes a finished exterior surface 152 that is engaged by the seal portion 108 of dynamic seal 100. The running sleeve 150 also includes a radial wall portion 150A extending adjacent to the radially extending portion 106 of the dynamic seal 100. The radial wall portion 150A limits the axial movement of the radially extending portion 106 of dynamic seal 100 in the rightward direction as illustrated in FIG. 8. The radially extending portion 106 of the dynamic seal 100 may also include a protruding portion 154 that can come in contact with the radially extending wall portion 150A of running sleeve 150. The protruding portion 154 limits the contact surface that engages the radial wall portion 150A so as to limit the friction contact between the dynamic seal 100 and running sleeve 150.

The running sleeve 150 also includes a radial flange portion 150B provided at a second end thereof that provides a barrier for limiting axial movement of the seal portion 108 in the leftward direction as illustrated in FIG. 8. Thus, the retaining flange 150B prevents the seal portion 108 from being dislodged from the exterior finished surface 152 of running sleeve 150. The running sleeve 150 can be connected to the retainer 130 so that the seal assembly can be assembled as a cassette-type seal or can be separate, as shown.

Figure 10:
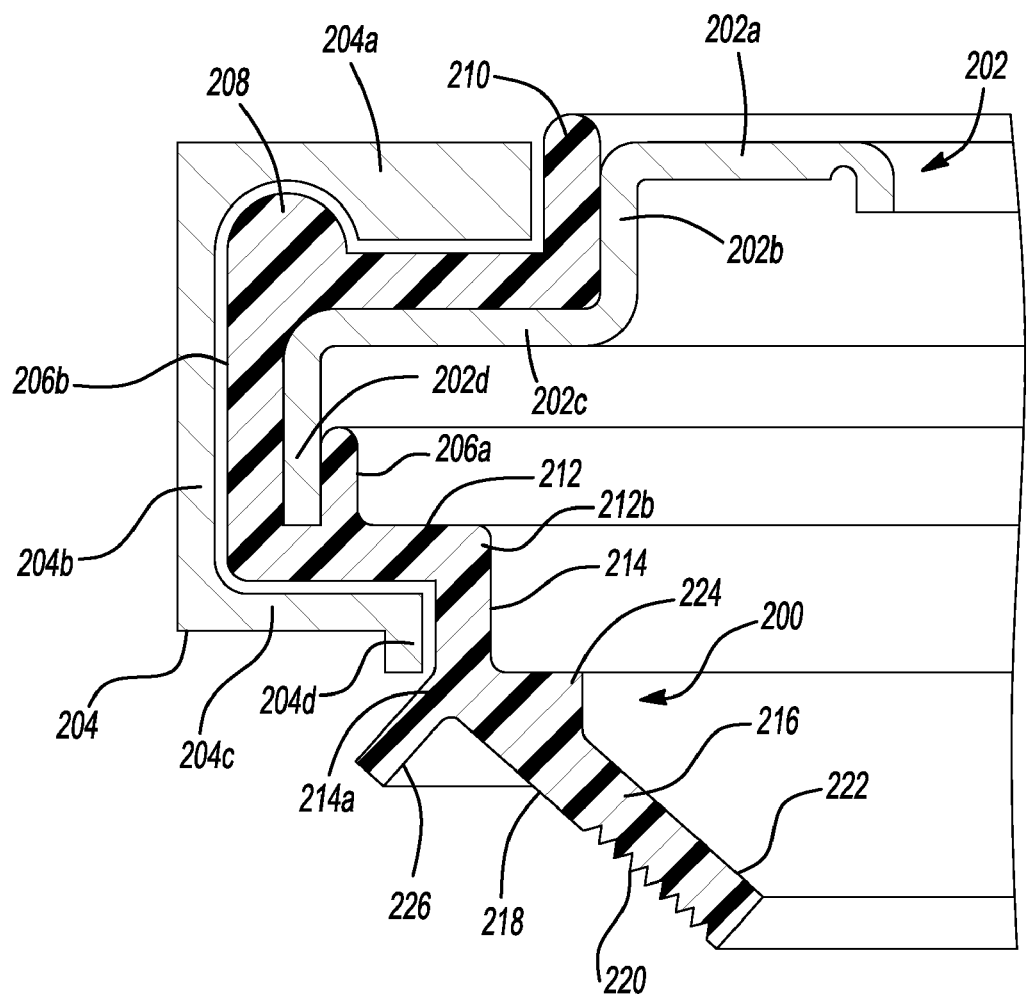
FIG. 10 is a cross-sectional view of a dynamic seal according to the principles of the present invention, including a support ring and casing.

With reference to FIG. 10, a dynamic seal 200, according to the principles of the present invention, is shown. The dynamic seal 200 is mounted to a metal casing 202 and is also provided with a support ring 204 which can be made from plastic, metal, or other materials. The dynamic seal 200 is mounted to the casing 202 which is adapted to be disposed in a fixed housing in a manner which is well known in the art. The dynamic seal 200 engages a rotary shaft or other member so that the dynamic seal 200 provides a sealed relationship between the rotary member and the housing in which the casing 202 is disposed. The dynamic seal 200 includes a mounting portion 206A, 206B with the portion 206B of the mounting portion overlapping the metal casing 202 on at least one face thereof. A mounting portion 206B defines a bead portion 208 extending radially outward away from casing 202. The mounting portion 206B can also extend radially beyond metal casing 202 so as to provide a friction engagement with the housing in which the seal assembly is inserted. The mounting portion 206A, 206B can take on many shapes and forms. The dynamic seal 200 includes an axially extending barrel portion 212 extending from a radially inner end of the mounting portion 206A, 206B, the axially extending barrel portion 212 is preferably general cylindrical in shape, although other shapes, such as conical or a convoluted curve shape, can also be utilized. The dynamic seal 200 includes a radially extending portion 214 extending inwardly from a distal end 212B of the axially extending barrel portion 212. A generally conically shaped seal portion 216 extends from a radially innermost end 214A of the radially extending portion 214. The seal portion 216 includes a radially inner face 218 which may be provided with a plurality of grooves 220. The grooves 220 can be helical in shape or can take other known forms. The grooves 220 provided in the radially inner surface 218 of the seal portion 216 are capable of retaining oil therein in order to provide lubrication between the dynamic shaft seal 200 and a rotary member, and also can provide a pumping function for returning leaked oil to the oil side of the seal. A radially outer face 222 of the conically shaped seal portion 216 is provided with a stiffening bead 224 defining a region of increased thickness. The stiffening bead 224 can have different shapes, including a triangular shape, as shown, or can have rounded or other shaped configurations. The stiffening bead of 224 is provided to allow a proper contact area to develop on the sealing lip 216. The bead 224 serves as an integrally formed spring for biasing the sealing lip 216 against the rotary shaft for counteracting bell mouthing of the sealing lip 216. Normally, the seal lip-free edge faces the oil side. However, reverse mounting is also possible. A dirt protective lip 226 extends from the end portion 214A of radially extending leg portion 214.

The support ring 204 includes an outer ring portion 204A which engages the bead 208 of mounting portion 206B in order to provide an axial restrain on the support ring 204. A radially extending portion 204B extends radially inward from the outer ring portion 204A and a second inner ring portion 204C extends axially from an innermost end portion of radial portion 204B. The inner ring 204C extends axially and parallel to the axially extending barrel portion 212 of dynamic seal 200. The inner ring 204C limits the radial movement of the axially extending barrel portion 212. The inner ring portion 204C includes a radially inwardly extending leg portion 204D which is generally parallel to the radially extending portion 214 of the dynamic seal 200. The radially extending leg portion 204D limits the axial movement of the radially extending portion 214 of the dynamic seal.

The casing 202 includes an outer ring portion 202A adapted to be received in a bore of a housing. A first radially inward step portion 202B extends radially inward from the outer ring portion 202A. A intermediate ring portion 202C extends axially from the radially inwardly extending portion 202B. A mounting arm 202D extends radially inward from the intermediate axial portion 202C. The dynamic seal 200 is mounted to the radially inwardly extending arm 202D.

Figure 11:
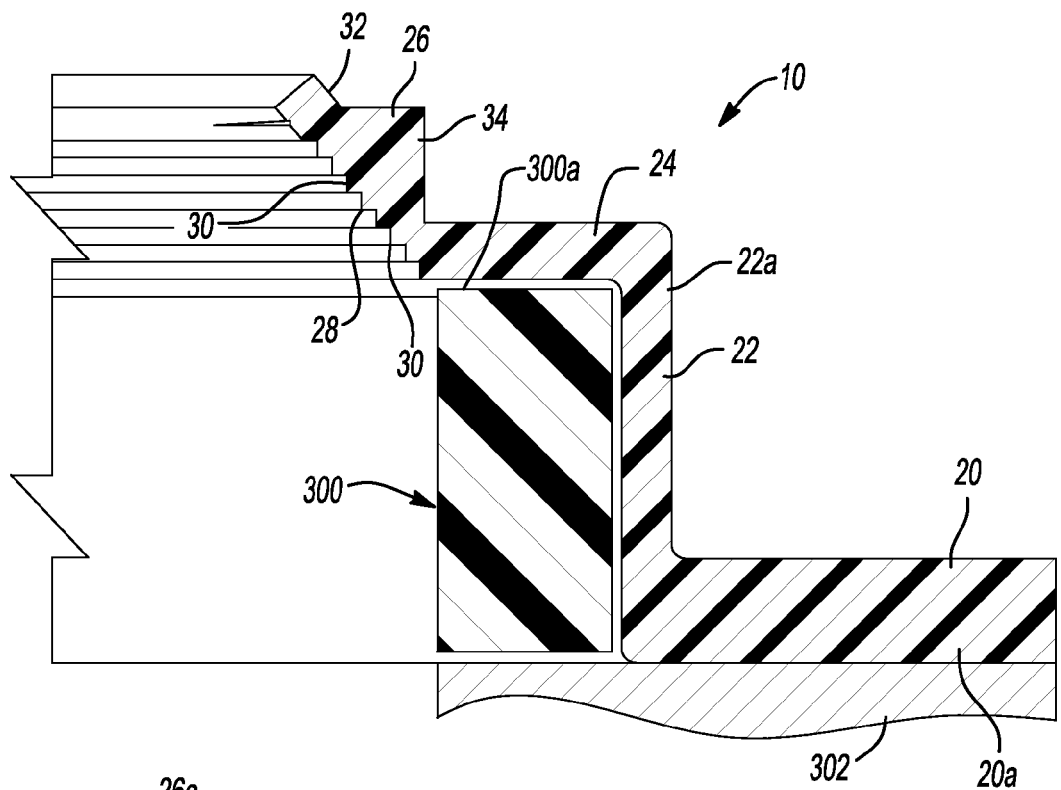
FIG. 11 is a detailed cross-sectional view of the dynamic seal according to the principles of the present invention with a support ring disposed therein.
Figure 12:
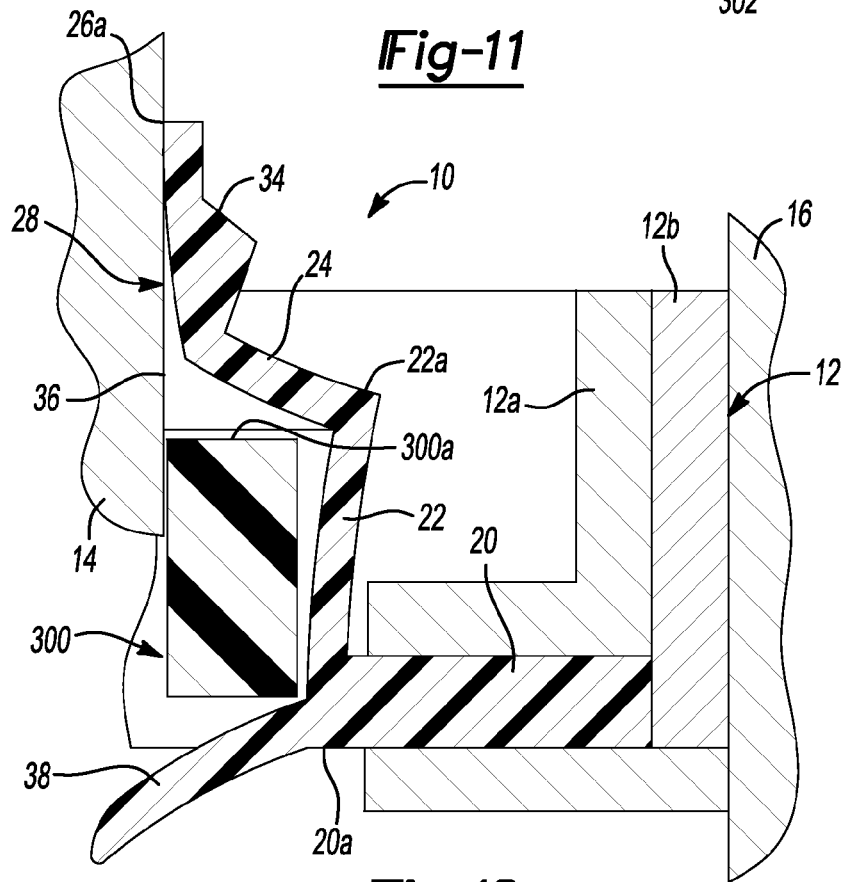
FIG. 12 is a cross-sectional view of the dynamic seal disposed against a shaft according to the principles of the present invention with a support ring disposed therein.

With reference to FIG. 11, a free floating support ring 300 is shown for use with the dynamic seal 10 which is shown in FIG. 1. The support ring 300 can be formed from plastic, metal, or other materials. The support ring 300 extends axially and parallel to the axially extending barrel portion 22 of the dynamic seal 10 and limits the radial movement of the axially extending barrel portion 22. The support ring 300 includes a radially extending end surface 300a which is generally parallel to the radially extending portion 24 of the dynamic seal 10. The radially extending end surface 300a limits the axial movement of the radially extending portion 24 of the dynamic seal. The support ring 300 is restrained from axial movement by radially extending portion 24 and by the exterior housing 302, or can be otherwise restrained by other members such as a dust lip 38, as shown in FIG. 12, or by other means either attached to or separate from the seal assembly.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A dynamic seal, comprising:
an annular mounting portion;
an axially extending portion extending in a first axial direction from said mounting portion;
a radially extending portion extending radially inwardly from an end of said axially extending portion;
a generally conically shaped seal portion extending from an end of said radially extending portion in a direction opposite said first axial direction, said seal portion including a radially inner face adapted to engage a rotary member and a radially outer face having a region of increased thickness, said region of increased thickness being spaced from a distal end of said conically shaped seal portion and being adjacent to an intersection between said radially extending portion and said conically shaped seal portion;
further comprising a running sleeve including an outer surface engaging a substantial axial length of said radially inner face of said seal portion from a location adjacent said region of increased thickness to a distal end of said seal portion opposite said radially extending portion; and
a retainer ring having an end coupled to said annular mounting portion and terminating at said annular mounting portion, said axially extending portion and said radially extending portion being free from any direct contact with said retainer ring.

2. The dynamic seal according to claim 1, wherein said running sleeve includes a radial wall portion adjacent said radially extending portion for limiting axial movement of said radially extending portion relative to said mounting portion.

3. The dynamic seal according to claim 1, wherein said running sleeve includes a first radial wall portion adjacent to a tip of said seal portion for limiting axial movement of said seal portion relative to said outer surface of said running sleeve.

4. The dynamic seal according to claim 3, wherein said radially extending portion includes a protruding portion extending toward a second radial wall portion of said running sleeve.

5. The dynamic seal according to claim 1, wherein said end of said retainer ring terminates within said annular mounting portion.

6. A dynamic seal, comprising:
an annular mounting portion;
an axially extending portion extending in a first axial direction from said mounting portion and being displaceable about a first pivot region defined at an interface between said annular mounting portion and said axially extending portion;
a radially extending portion extending radially inwardly from an end of said axially extending portion;
a generally conically shaped seal portion extending from an end of said radially extending portion in a direction opposite said first axial direction, said seal portion including a radially inner face adapted to engage a rotary member and a radially outer face having a region of increased thickness, said region of increased thickness being spaced from a distal end of said conically shaped seal portion and being adjacent to an intersection between said radially extending portion and said conically shaped seal portion;
a running sleeve including an outer surface engaging a substantial axial length of said radially inner face of said seal portion; and
a retainer ring having an end coupled to said annular mounting portion and terminating at said annular mounting portion, said axially extending portion and said radially extending portion being free from any direct contact with said retainer ring.

7. The dynamic seal according to claim 6, wherein said radially extending portion is displaceable about a second pivot region defined at an interface between said axially extending portion and said radially extending portion.

8. The dynamic seal according to claim 6, wherein said radially inner face engages said outer surface of said running sleeve from a location adjacent said region of increased thickness to a distal end of said seal portion opposite said radially extending portion.

9. The dynamic seal according to claim 6, wherein said running sleeve includes a radial wall portion adjacent said radially extending portion for limiting axial movement of said radially extending portion relative to said mounting portion.

10. The dynamic seal according to claim 6, wherein said running sleeve includes a first radial wall portion adjacent to a tip of said seal portion for limiting axial movement of said seal portion relative to said outer surface of said running sleeve.

11. The dynamic seal according to claim 10, wherein said radially extending portion includes a protruding portion extending toward a second radial wall portion of said running sleeve.

12. The dynamic seal according to claim 6, wherein said conically shaped seal portion is secured axially between first and second radial wall portions extending from opposite ends of said running sleeve.

13. The dynamic seal according to claim 6, wherein said end of said retainer ring terminates within said annular mounting portion.

* * * * *